United States Patent
Wang et al.

(10) Patent No.: US 9,529,753 B2
(45) Date of Patent: Dec. 27, 2016

(54) INTERFACE SHARING APPARATUS AND METHOD, AND MOBILE COMMUNICATIONS TERMINAL

(71) Applicant: Huawei Device Co., LTD, Shenzhen (CN)

(72) Inventors: Chuang Wang, Shenzhen (CN); Zhiyong Tang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/523,630

(22) Filed: Oct. 24, 2014

(65) Prior Publication Data

US 2015/0042889 A1 Feb. 12, 2015

Related U.S. Application Data

(63) Continuation of application No. PCT/CN2013/078607, filed on Jul. 1, 2013.

(30) Foreign Application Priority Data

Jul. 13, 2012 (CN) .......................... 2012 1 0243534

(51) Int. Cl.
*G06F 13/38* (2006.01)
(52) U.S. Cl.
CPC .................... *G06F 13/385* (2013.01)
(58) Field of Classification Search
None
See application file for complete search history.

(56) References Cited

U.S. PATENT DOCUMENTS

| 7,711,870 B2 * | 5/2010 | Yoshida | G06F 13/4295 326/62 |
| 2007/0239924 A1 * | 10/2007 | Foo | G06F 13/385 710/316 |
| 2009/0248924 A1 * | 10/2009 | Melin | G09G 5/006 710/63 |
| 2012/0265911 A1 * | 10/2012 | Connolly | G06F 13/387 710/300 |

(Continued)

FOREIGN PATENT DOCUMENTS

| CN | 101452051 A | 6/2009 |
| CN | 101464849 A | 6/2009 |

(Continued)

*Primary Examiner* — Ilwoo Park
(74) *Attorney, Agent, or Firm* — Slater Matsil, LLP (57) ABSTRACT

The present invention discloses an interface sharing apparatus and method, and a mobile communications terminal. The apparatus includes a control unit, a video processing unit, a switch unit, a detection control unit and a multiplexing interface. The detection control unit is configured to detect a first voltage from the multiplexing interface, and to compare the first voltage with a preset voltage value. If the first voltage is greater than zero and less than or equal to the preset voltage value, the detection control unit controls the switch unit, so that the video processing unit is connected to the multiplexing interface by using the switch unit. If the first voltage is equal to zero or greater than the preset voltage value, the detection control unit controls the switch unit, so that the control unit is connected to the multiplexing interface by using the switch unit.

6 Claims, 4 Drawing Sheets

(56) References Cited

U.S. PATENT DOCUMENTS

2013/0101132 A1    4/2013  Gu et al.

FOREIGN PATENT DOCUMENTS

| CN | 201490478 U | 5/2010 |
| CN | 101917497 A | 12/2010 |
| CN | 201927859 U | 8/2011 |
| CN | 201945991 U | 8/2011 |
| CN | 102890666 A | 1/2013 |
| JP | 2011524096 A | 8/2011 |
| JP | 2012506096 A | 3/2012 |
| KR | 20060068603 A | 6/2006 |
| WO | 2009118582 A1 | 10/2009 |
| WO | 2010045363 A2 | 4/2010 |
| WO | 2010051281 A2 | 5/2010 |
| WO | 2011158310 A1 | 12/2011 |

* cited by examiner

FIG. 7

INTERFACE SHARING APPARATUS AND METHOD, AND MOBILE COMMUNICATIONS TERMINAL This application is a continuation of International Application No. PCT/CN2013/078607, filed on Jul. 1, 2013, which claims priority to Chinese Patent Application No. 201210243534.8, filed on Jul. 13, 2012, both of which are hereby incorporated by reference in their entireties.

TECHNICAL FIELD

The present invention relates to the field of interface sharing and, in particular embodiments, to an interface sharing apparatus and method, and a mobile communications terminal.

BACKGROUND

Currently, mobile communications terminals, such as tablet computers, are becoming more widespread in people's daily life. To satisfy different demands of users and implement as many functions as possible, various different functional interfaces, such as a power or charging interface, a USB (universal serial bus) interface, and an HDMI (high definition multimedia interface) interface for outputting high-definition signals, coexist on hardware of a mobile communications terminal.

Figure 1:
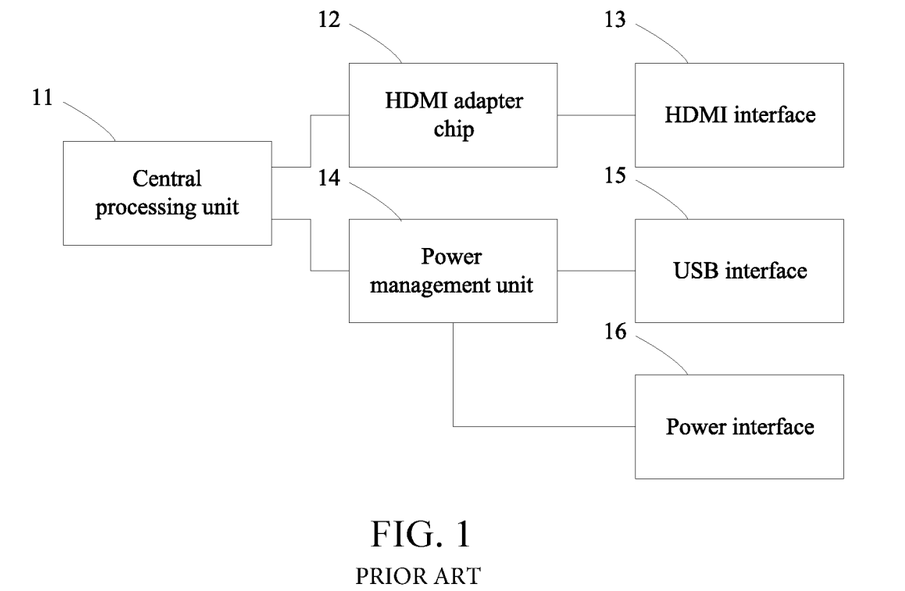
FIG. 1 is a schematic structural diagram of a mobile communications terminal in the prior art.

Referring to FIG. 1, FIG. 1 is a schematic structural diagram of a mobile communications terminal in the prior art. As shown in FIG. 1, a mobile communications terminal 10 in the prior art includes a central processing unit 11, an HDMI adapter chip 12, an HDMI interface 13, a power management unit 14, a USB interface 15 and a power interface 16, where the HDMI adapter chip 12 is connected to the central processing unit 11, so as to obtain a video data stream and an audio data stream from the central processing unit 11, and convert the video data stream and the audio data stream to an HDMI data stream, and the HDMI adapter chip 12 outputs the HDMI data stream by using the HDMI interface 13. The power management unit 14 is connected to the central processing unit 11 and performs charging or data transmission for the mobile communications terminal 10 by using the USB interface 15, and the power management unit 14 may further be connected to a power supply by using the power interface 16. Therefore, the mobile communications terminal 10 in the prior art requires connection cables matching different interfaces to implement different functions, which brings great inconvenience to a user. In addition, the HDMI interface 13, the USB interface 15, and the power interface 16 of the mobile communications terminal 10 in the prior art increase a size of the mobile communications terminal 10, thereby increasing costs of the mobile communications terminal 10.

SUMMARY

Embodiments of the present invention provides an interface sharing apparatus and method, and a mobile communications terminal, and implements multiple functions by using one multiplexing interface, so as to reduce costs.

One embodiment of the present invention provides an interface sharing apparatus that includes a control unit, a video processing unit, a switch unit, a detection control unit and a multiplexing interface. The control unit and the video processing unit are separately connected to the switch unit. The switch unit is connected to the multiplexing interface. The detection control unit is configured to detect a first voltage from the multiplexing interface, and to compare the first voltage with a preset voltage value. If the first voltage is greater than zero and less than or equal to the preset voltage value, the detection control unit controls the switch unit, so that the video processing unit is connected to the multiplexing interface by using the switch unit. If the first voltage is equal to zero or greater than the preset voltage value, the detection control unit controls the switch unit, so that the control unit is connected to the multiplexing interface by using the switch unit.

Another embodiment of the present invention provides a mobile communications terminal that includes a USB OTG controller, a mobile high-definition link (MHL) adapter chip, a changeover switch chip and a multiplexing interface. The USB OTG controller and the MHL adapter chip are separately connected to the changeover switch chip; the changeover switch chip is connected to the multiplexing interface. The MHL adapter chip detects a first voltage from the multiplexing interface, and compares the first voltage with a preset voltage value. If the first voltage is greater than zero and less than or equal to the preset voltage value, the MHL adapter chip controls the changeover switch chip, so that the MHL adapter chip is connected to the multiplexing interface by using the changeover switch chip. If the first voltage is equal to zero or greater than the preset voltage value, an MHL controls the changeover switch chip, so that the USB OTG controller is connected to the multiplexing interface by using the changeover switch chip.

Another embodiment of the present invention provides an interface sharing method, which is applied to an interface sharing apparatus. The apparatus includes a control unit, a video processing unit, a switch unit and a multiplexing interface. The control unit and the video processing unit are separately connected to the switch unit, and the switch unit is connected to the multiplexing interface. The method includes detecting a first voltage of the multiplexing interface; comparing the first voltage with a preset voltage value. If the first voltage is greater than zero and less than or equal to the preset voltage value, the switch unit is controlled so that the video processing unit is connected to the multiplexing interface by using the switch unit. If the first voltage is equal to zero or greater than the preset voltage value, the switch unit is controlled so that the control unit is connected to the multiplexing interface by using the switch unit.

A beneficial effect of the present invention is that, in the present invention, multiple functions are implemented by using one multiplexing interface, thereby reducing the volume of an interface, reducing costs, facilitating operations and use of a user, and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts, wherein.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
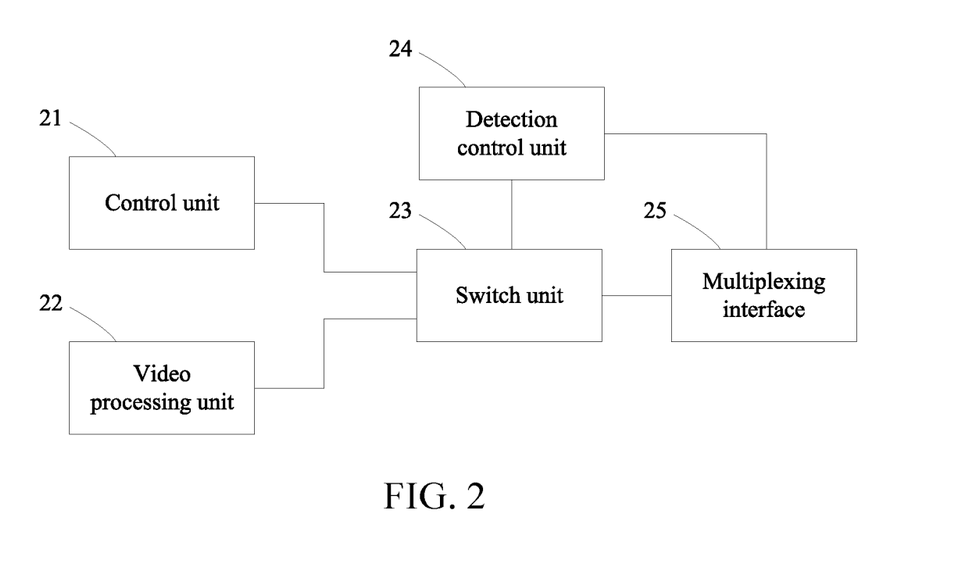
FIG. 2 is a schematic structural diagram of an interface sharing apparatus according to a first embodiment of the present invention.

FIG. 2 is a schematic block diagram of an interface sharing apparatus according to a first embodiment of the present invention. As shown in FIG. 2, the apparatus 20 disclosed in this embodiment can implement interface sharing between an MHL and a USB, and the apparatus 20 includes: a control unit 21, a video processing unit 22, a switch unit 23, a detection control unit 24 and a multiplexing interface 25.

In this embodiment, the control unit 21 and the video processing unit 22 are optionally connected to the multiplexing interface 25 by using the switch unit 23, and the detection control unit 24 is separately connected to the switch unit 23 and the multiplexing interface 25, where a preset voltage value is configured for the detection control unit 24 and the detection control unit 24 obtains a first voltage from the multiplexing interface 25.

In this embodiment, the detection control unit 24 compares the first voltage with the preset voltage value and controls the switch unit 23 according to a comparison result. If the first voltage is greater than zero and less than or equal to the preset voltage value, the detection control unit 24 controls the switch unit 23, so that the video processing unit 22 is connected to the multiplexing interface 25 by using the switch unit 23. If the first voltage is equal to zero or greater than the preset voltage value, the detection control unit 24 controls the switch unit 23, so that the control unit 21 is connected to the multiplexing interface 25 by using the switch unit 23.

In this embodiment, the video processing unit 22 is preferably an MHL adapter chip, where the video processing unit 22 can convert parallel RGB signals to serial MHL video signals.

In this embodiment, the control unit 21 is preferably a USB OTG (USB On The Go or mobile USB) controller, where the control unit 21 is configured to transmit a USB OTG signal.

In this embodiment, the multiplexing interface 25 is preferably a Micro USB interface.

Different from a condition in the prior art, the apparatus 20 disclosed in this embodiment implements multiple functions by using one multiplexing interface 25, thereby reducing the volume of an interface, reducing costs, and improving user experience.

Figure 3:
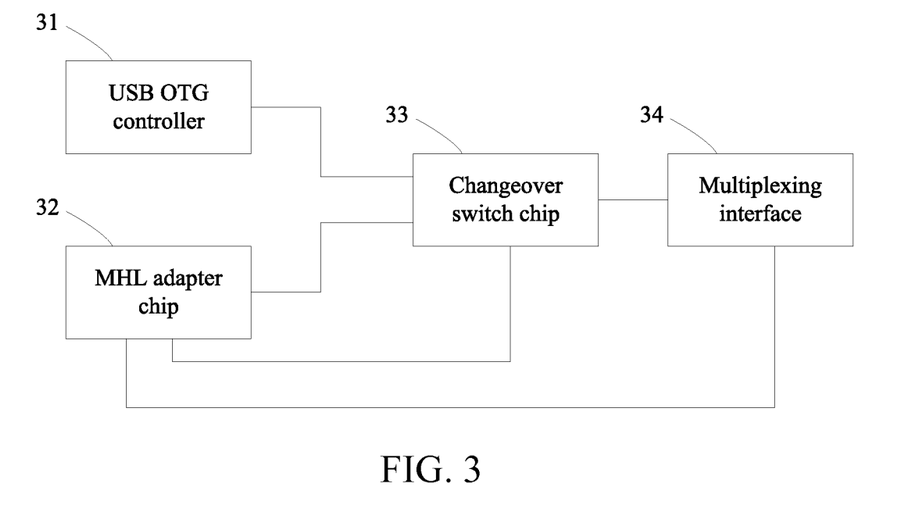
FIG. 3 is a schematic structural diagram of a mobile communications terminal according to a second embodiment of the present invention.

Referring to FIG. 3, FIG. 3 is a schematic block diagram of a mobile communications terminal according to a second embodiment of the present invention. As shown in FIG. 3, a mobile communications terminal 30 disclosed in this embodiment includes: a USB OTG controller 31, an MHL adapter chip 32, a changeover switch chip 33 and a multiplexing interface 34.

In this embodiment, the USB OTG controller 31 and the MHL adapter chip 32 are optionally connected to the multiplexing interface 34 by using the changeover switch chip 33, and the MHL adapter chip is further separately connected to the changeover switch chip 33 and the multiplexing interface 34. A preset voltage value is configured for the MHL adapter chip 32.

In this embodiment, the MHL adapter chip 32 detects a first voltage from the multiplexing interface 34 and compares the first voltage with the preset voltage value, where if the first voltage is greater than zero and less than or equal to the preset voltage value, the MHL adapter chip 32 controls the changeover switch chip 33, so that the MHL adapter chip 32 is connected to the multiplexing interface 34 by using the changeover switch chip 33; and if the first voltage is equal to zero or greater than the preset voltage value, the MHL adapter chip 32 controls the changeover switch chip 33, so that the USB OTG controller 31 is connected to the multiplexing interface 34 by using the changeover switch chip 33.

Different from a condition in the prior art, the mobile communications terminal 30 disclosed in this embodiment controls the changeover switch chip 33 by using the MHL adapter chip 32, so that the multiplexing interface 34 is optionally connected to the USB OTG controller 31 or the MHL adapter chip 32. Therefore, functions of an MHL and a USB are implemented by using one multiplexing interface 34, thereby reducing the volume of an interface, reducing costs of the mobile communications terminal 30, and improving user experience.

The present invention further provides a mobile communications terminal according to a third embodiment, where the mobile communications terminal is described in detail on a basis of the foregoing second embodiment.

Figure 4:
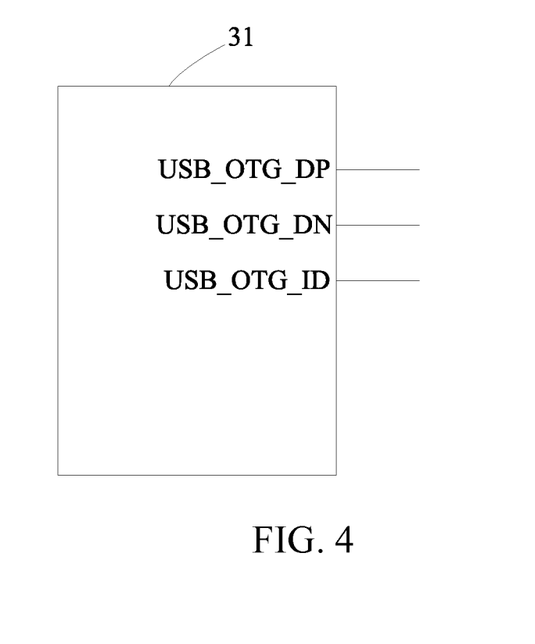
FIG. 4 is a schematic structural diagram of a USB OTG controller in FIG. 3.

As shown in FIG. 4, a USB OTG controller 31 is configured to transmit a USB OTG signal, where the USB OTG controller 31 includes a pin USB_OTG_DP, a pin USB_OTG_DN, and a pin USB_OTG_ID.

Figure 5:
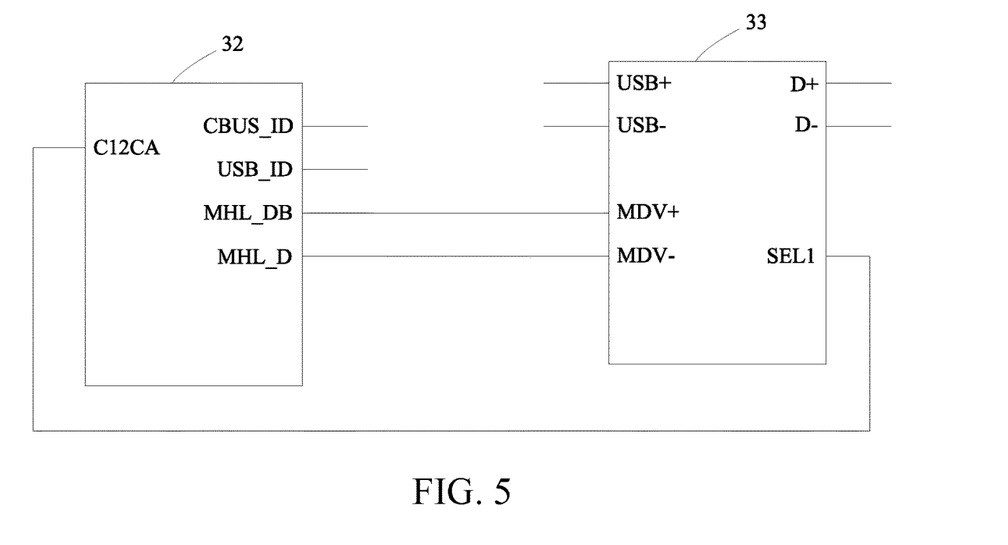
FIG. 5 is a schematic structural diagram of an MHL adapter chip and a changeover switch chip that are shown in FIG. 3.

As shown in FIG. 5, an MHL adapter chip 32 converts parallel RGB signals to serial MHL video signals, where the MHL adapter chip 32 includes a pin MHL_DB, a pin MHL_D, a pin CBUS_ID, a pin C12CA and a pin USB_ID, and the pin USB_ID is connected to the pin USB_OTG_ID. A changeover switch chip 33 includes a pin USB+, a pin USB−, a pin MDV+, a pin MDV−, a pin D+, a pin D− and a pin SEL1, where the pin USB+ is connected to the pin USB_OTG_DP, the pin USB− is connected to the pin USB_OTG_DN, the pin MDV+ is connected to the pin MHL_DB, the pin MDV− is connected to the pin MHL_D, and the pin SEL1 is connected to the pin C12CA.

Figure 6:
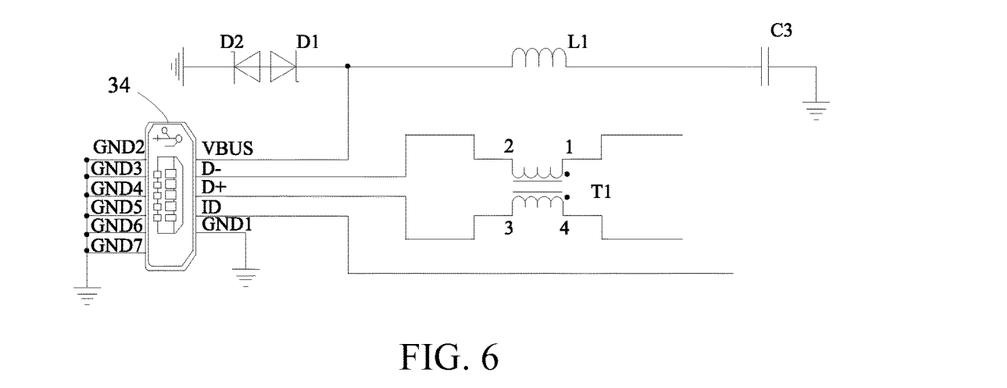
FIG. 6 is a schematic structural diagram of a multiplexing interface in FIG. 3.

As shown in FIG. 6, a multiplexing interface 34 includes a pin VBUS, a pin D−, a pin D+, a pin ID and pins GND 1-7, where the pins GND 1-7 are grounded, and the pin ID of the multiplexing interface 34 is connected to the pin CBUS_ID of the MHL adapter chip 32. A transformer T1 is disposed between the multiplexing interface 34 and the changeover switch chip 33, where a first terminal and a fourth terminal of the transformer T1 are terminals on the same side, the first terminal of the transformer T1 is connected to the pin D− of the changeover switch chip 33, a second terminal of the transformer T1 is connected to the pin D− of the multiplexing interface 34, a third terminal of the transformer T1 is connected to the pin D+ of the multiplexing interface 34, and the fourth terminal of the transformer T1 is connected to the pin D+ of the changeover switch chip 33. The pin VBUS is connected between a negative electrode of a voltage regulator tube D1 and an inductor L1, where a positive electrode of the voltage regulator tube D1 is connected to a positive electrode of a voltage regulator tube D2, a negative electrode of the voltage regulator tube D2 is grounded, the other terminal of the inductor L1 is connected to one terminal of a capacitor C1, and the other terminal of the capacitor C1 is grounded.

The following describes in detail a working principle for the mobile communications terminal in this embodiment to implement multiple functions by using the multiplexing interface 34.

The MHL adapter chip 32 detects a first voltage from the pin ID of the multiplexing interface 34 by using the pin CBUS_ID and compares the first voltage with a preset voltage value.

When the MHL adapter chip 32 determines that the first voltage is greater than zero and less than or equal to the preset voltage value, the MHL adapter chip 32 outputs a control signal to the pin SEL1 of the changeover switch chip 33 by using the pin C12CA, so as to control the pin MDV+ of the changeover switch chip 33 to connect to the pin D+, and control the pin MDV− to connect to the pin D−. In this case, the pin MHL_DB of the MHL adapter chip 32 is connected to the pin D+ of the multiplexing interface 34 by using the changeover switch chip 33, and the pin MHL_D of the MHL adapter chip 32 is connected to the pin D− of the multiplexing interface 34 by using the changeover switch chip 33.

When the MHL adapter chip 32 determines that the first voltage is equal to zero or greater than the preset voltage value, the MHL adapter chip 32 outputs a control signal to the pin SEL1 of the changeover switch chip 33 by using the pin C12CA, so as to control the pin USB+ of the changeover switch chip 33 to connect to the pin D+, and control the pin USB− to connect to the pin D−. In this case, the pin USB_OTG_DP of the MHL adapter chip 31 is connected to the pin D+ of the multiplexing interface 34 by using the changeover switch chip 33, and the pin USB_OTG_DN of the MHL adapter chip 31 is connected to the pin D− of the multiplexing interface 34 by using the changeover switch chip 33.

In this embodiment, when the MHL adapter chip 32 determines that the first voltage is equal to zero or greater than the preset voltage value, the USB OTG controller 31 obtains the first voltage from the pin USB_ID of the MHL adapter chip 32 by using the pin USB_OTG_ID and determines whether the first voltage is at a high level.

When the USB OTG controller 31 determines that the first voltage is at a high level, the USB OTG controller 31 sends data by using the multiplexing interface 34.

When the USB OTG controller 31 determines that the first voltage is at a low level, the USB OTG controller 31 reads data by using the multiplexing interface 34.

It should be noted that in this embodiment, a capacitance value of the capacitor C1 is preferably 2.2 uF.

Different from a condition in the prior art, the mobile communications terminal 30 disclosed in this embodiment controls the changeover switch chip 33 by using the MHL adapter chip 32, so that the multiplexing interface 34 is optionally connected to the USB OTG controller 31 or the MHL adapter chip 32. Therefore, functions of an MHL and a USB are implemented by using one multiplexing interface 34, thereby reducing the volume of an interface, reducing costs of the mobile communications terminal 30, and improving user experience.

With reference to an interface sharing method in the present invention, the following further describes in detail that an interface sharing apparatus 20 according to an embodiment of the present invention implements functions of an MHL and a USB by using a multiplexing interface 25.

Figure 7:
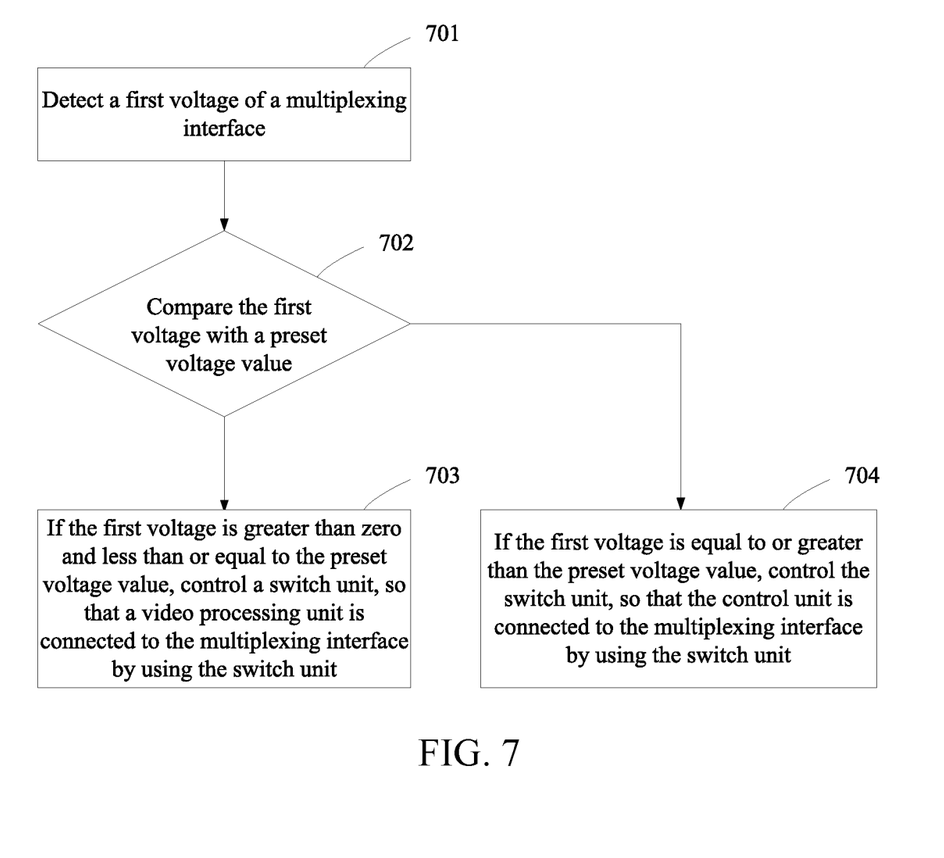
FIG. 7 is a flowchart of an interface sharing method according to a first embodiment of the present invention.

Referring to FIG. 7, FIG. 7 is a flowchart of an interface sharing method according to a first embodiment of the present invention. The method disclosed in this embodiment is applied to the apparatus 20 disclosed in the first embodiment of the present invention. As shown in FIG. 7, the interface sharing method disclosed in this embodiment of the present invention includes the following steps:

Step 701: Detect a first voltage of a multiplexing interface 25.

Step 702: Compare the first voltage with a preset voltage value.

Step 703: If the first voltage is greater than zero and less than or equal to the preset voltage value, control a switch unit 23, so that a video processing unit 22 is connected to the multiplexing interface 25 by using the switch unit 23.

Step 704: If the first voltage is equal to zero or greater than the preset voltage value, control the switch unit 23, so that a control unit 21 is connected to the multiplexing interface 25 by using the switch unit 23.

In this embodiment, a detection control unit 24 detects the first voltage of the multiplexing interface 25, and the detection control unit 24 compares the first voltage with the preset voltage value. If the first voltage is greater than zero and less than or equal to the preset voltage value, the detection control unit 24 controls the switch unit 23, so that the video processing unit 22 is connected to the multiplexing interface 25; and if the first voltage is equal to zero or greater than the preset voltage value, the detection control unit 24 controls the switch unit 23, so that the control unit 21 is connected to the multiplexing interface 25.

In this embodiment, the video processing unit 22 is preferably an MHL adapter chip, where the video processing unit 22 can convert parallel RGB signals into serial MHL video signals.

In this embodiment, the control unit 21 is preferably a USB OTG controller, where the control unit 21 is configured to transmit a USB OTG signal.

In this embodiment, the multiplexing interface 25 is preferably a Micro USB interface.

Different from a condition in the prior art, the present invention implements multiple functions by using one multiplexing interface, thereby reducing the volume of an interface, reducing costs, facilitating operations and use of a user, and improving user experience.

Based on the foregoing descriptions of the implementation manners, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely embodiments of the present invention, and the protection scope of the present invention is not limited thereto. All equivalent structural or process changes made according to the content of this specification and accompanying drawings in the present invention or by directly or indirectly applying the present invention in other relevant technical fields shall fall within the protection scope of the present invention.

What is claimed is:

1. An interface sharing apparatus comprising:
a first controller, comprising a universal serial bus on the go (USB_OTG) controller, wherein the USB_OTG controller is configured to transmit a USB_OTG signal, and the USB_OTG controller comprises a pin USB_OTG_DP and a pin USB_OTG_DN;
a video processor, comprising a mobile high-definition link (MHL) adapter chip, wherein the MHL adapter chip is configured to convert parallel RGB signals to serial MHL video signals, and the MHL adapter chip comprises a pin MHL_DB, a pin MHL_D, a pin CBUS_ID, and a pin C12CA;
a switch, wherein the first controller and the video processor are separately connected to the switch, and wherein the switch comprises a pin USB+, a pin USB−, a pin MDV+, a pin MDV−, a pin D+, a pin D− and a pin SEL1;
a multiplexer, wherein the switch is connected to the multiplexer, and wherein the multiplexer comprises a pin VBUS, a pin D+, a pin D−, a pin ID and pins GND; and
a second controller configured to detect a first voltage from the multiplexer and to compare the first voltage with a preset voltage value, wherein the second controller is further configured such that when the first voltage is greater than zero and less than or equal to the preset voltage value, the second controller controls the switch so that the video processor is connected to the multiplexer using the switch, and, when the first voltage is equal to zero or greater than the preset voltage value, the second controller controls the switch so that the first controller is connected to the multiplexer by using the switch;
wherein the pin USB+ is connected to the pin USB_OTG_DP, the pin USB− is connected to the pin USB_OTG_DN, the pin MDV+ is connected to the pin MHL_DB, the pin MDV− is connected to the pin MHL_D, the pin SEL1 is connected to the pin C12CA, the MHL adapter chip controls the switch by using the pin SEL1 and the pin C12CA, the pin D+ of the switch is connected to the pin D+ of the multiplexer, the pin D− of the switch is connected to the pin D− of the multiplexer, the pin ID is connected to the pin CBUS_ID, and the MHL adapter chip detects the first voltage from the pin ID by using the pin CBUS_ID.

2. The apparatus according to claim 1, wherein when the first voltage is greater than zero and less than or equal to the preset voltage value, the pin MHL_DB and the pin MHL_D of the MHL adapter chip are respectively connected to the pin D− and the pin D+ of the multiplexer by using the switch and, when the first voltage is equal to zero or greater than the preset voltage value, the pin USB_OTG_DP and the pin USB_OTG_DN of the USB OTG controller are respectively connected to the pin D− and the pin D+ of the multiplexer by using the switch.

3. A mobile communications terminal comprising:
a USB_OTG (universal serial bus on the go) controller, wherein the USB_OTG controller is configured to transmit a USB_OTG signal, and the USB_OTG controller comprises a pin USB_OTG_DP and a pin USB_OTG_DN;
an mobile high-definition link (MHL) adapter chip, wherein the MHL adapter chip configured to convert parallel RGB signals to serial MHL video signals, and the MHL adapter chip comprises a pin MHL_DB, a pin MHL_D, a pin CBUS_ID, and a pin C12CA;
a changeover switch chip, wherein the USB OTG controller and the MHL adapter chip are separately connected to the changeover switch chip, and wherein the changeover switch chip comprises a pin USB+, a pin USB−, a pin MDV+, a pin MDV−, a pin D+, a pin D− and a pin SEL1; and
a multiplexing interface, wherein the changeover switch chip is connected to the multiplexing interface, and wherein the multiplexing interface comprises a pin VBUS, a pin D+, a pin D−, a pin ID and pins GND;
wherein the MHL adapter chip is configured to detect a first voltage from the multiplexing interface and to compare the first voltage with a preset voltage value such that when the first voltage is greater than zero and less than or equal to the preset voltage value, the MHL adapter chip will control the changeover switch chip so that the MHL adapter chip is connected to the multiplexing interface using the changeover switch chip and when the first voltage is equal to zero or greater than the preset voltage value, the MHL adapter chip will control the changeover switch chip so that the USB OTG controller is connected to the multiplexing interface by using the changeover switch chip;
wherein the pin USB+ is connected to the pin USB_OTG_DP, the pin USB− is connected to the pin USB_OTG_DN, the pin MDV+ is connected to the pin MHL_DB, the pin MDV− is connected to the pin MHL_D, the pin SEL1 is connected to the pin C12CA, the MHL adapter chip controls the changeover switch chip by using the pin SEL1 and the pin C12CA, the pin D+ of the changeover switch chip is connected to the pin D+ of the multiplexing interface, the pin D− of the changeover switch chip is connected to the pin D− of the multiplexing interface, the pin ID is connected to the pin CBUS_ID, and the MHL adapter chip detects the first voltage from the pin ID by using the pin CBUS_ID.

4. The mobile communications terminal according to claim 3, wherein when the first voltage is greater than zero and less than or equal to the preset voltage value, the pin MHL_DB and the pin MHL_D of the MHL adapter chip are respectively connected to the pin D− and the pin D+ of the multiplexing interface by using the changeover switch chip and, when the first voltage is equal to zero or greater than the preset voltage value, the pin USB_OTG_DP and the pin USB_OTG_DN of the USB OTG controller are respectively connected to the pin D− and the pin D+ of the multiplexing interface by using the changeover switch chip.

5. An interface sharing method, wherein the interface sharing method is applied to an interface sharing apparatus that comprises a first controller, a video processor, a switch and a multiplexing interface, the first controller and the video processor being separately connected to the switch, and the switch being connected to the multiplexing interface the method comprising:

detecting a first voltage of the multiplexing interface;

comparing the first voltage with a preset voltage value; and controlling the switch so that the video processor is connected to the multiplexing interface when the first voltage is greater than zero and less than or equal to the preset voltage value and so that and so that the first controller is connected to the multiplexing interface when the first voltage is equal to zero or greater than the preset voltage value;

wherein the USB_OTG controller is configured to transmit a USB_OTG signal and the USB_OTG controller comprises a pin USB_OTG_DP and a pin USB_OTG_DN;

wherein the MHL adapter chip is configured to convert parallel RGB signals to serial MHL video signals, and the MHL adapter chip comprises a pin MHL_DB, a pin MHL_D, a pin CBUS_ID, and a pin C12CA;

wherein the switch comprises a pin USB+, a pin USB−, a pin MDV+, a pin MDV−, a pin D+, a pin D− and a pin SEL1;

wherein the multiplexing interface comprises a pin VBUS, a pin D+, a pin D−, a pin ID and pins GND; and wherein the pin USB+ is connected to the pin USB_OTG_DP, the pin USB− is connected to the pin USB_OTG_DN, the pin MDV+ is connected to the pin MHL_DB, the pin MDV− is connected to the pin MHL_D, the pin SEL1 is connected to the pin C12CA, the MHL adapter chip controls the switch by using the pin SEL1 and the pin C12CA, the pin D+ of the switch is connected to the pin D+ of the multiplexing interface, the pin D− of the switch is connected to the pin D− of the multiplexing interface, the pin ID is connected to the pin CBUS_ID, and the MHL adapter chip detects the first voltage from the pin ID by using the pin CBUS_ID.

6. The method according to claim 5, wherein controlling the switch comprises:

connecting the pin MHL_DB and the pin MHL_D of the MHL adapter chip to the pin D− and the pin D+ of the multiplexing interface when the first voltage is greater than zero and less than or equal to the preset voltage value; and connecting the pin USB_OTG_DP and the pin USB_OTG_DN of the USB OTG controller to the pin D− and the pin D+ of the multiplexing interface when the first voltage is equal to zero or greater than the preset voltage value.

* * * * *